Oct. 19, 1948.  F. MASSA  2,451,966

TRANSDUCER

Filed Nov. 18, 1944  4 Sheets-Sheet 1

INVENTOR.
FRANK MASSA
BY
Eber J. Hyde
ATTORNEY

Oct. 19, 1948.　　　　　　　F. MASSA　　　　　　2,451,966
　　　　　　　　　　　　　TRANSDUCER

Filed Nov. 18, 1944　　　　　　　　　　　　4 Sheets-Sheet 2

INVENTOR.
FRANK MASSA
BY
Elser J. Hyde
ATTORNEY

Oct. 19, 1948.                     F. MASSA                     2,451,966
                                  TRANSDUCER
Filed Nov. 18, 1944                                          4 Sheets-Sheet 3

INVENTOR.
FRANK MASSA
BY
*Eber J. Hyde*
ATTORNEY

Oct. 19, 1948.  F. MASSA  2,451,966
TRANSDUCER

Filed Nov. 18, 1944  4 Sheets-Sheet 4

INVENTOR.
FRANK MASSA
BY
ATTORNEY

Patented Oct. 19, 1948

2,451,966

UNITED STATES PATENT OFFICE 2,451,966

TRANSDUCER

Frank Massa, Cleveland Heights, Ohio, assignor to The Brush Development Company, Cleveland, Ohio, a corporation of Ohio Application November 18, 1944, Serial No. 564,138

23 Claims. (Cl. 171—327)

My invention pertains to piezoelectricity, and more particularly to a piezoelectric plate having novel orientation of its major faces with respect to the piezoelectric axes of the crystalline material and to a multiplate flexing unit comprised of two or more of these new plates forming a composite unit which has a new action, and also to devices utilizing this new plate and this new multiplate unit.

This application is a continuation-in-part of my application Serial Number 431,429, filed February 18, 1942, for Transducer means, now abandoned, and is a continuation-in-part of my application Serial Number 452,908, filed July 30, 1942, for Piezoelectric unit, now abandoned.

Rochelle salt is an isomorphous substance belonging to the rhombic hemihedral class of crystals and exhibits a piezoelectric effect when subjected to an electric field in certain directions or when subjected to mechanical pressure in certain directions. Other isomorphous substances belonging to the rhombic hemihedral class of crystals exhibit the piezoelectric effect and accordingly may be spoken of as Rochelle salt type crystals although they may not have the Rochelle salt chemical formula.

Rochelle salt type crystals have three orthogonal crystallographic axes sometimes called A, B and C and sometimes called X, Y and Z, and the smaller crystal elements which are cut from the larger virgin crystals may have different orientation with respect to the orthogonal axes and different dimensions along the axes to bring out various characteristics of the crystal material; for example, X, Y, and Z-cut plates.

My invention relates to a crystal element cut from a virgin crystal with a particular orientation and relative dimensions to effect a new result.

An object of my invention is to provide a piezoelectric crystal element capable of being used with greater efficiency.

Another object of my invention is to reduce heating due to friction between a piezoelectric crystal element and its supporting base.

A further object of my invention is to reduce undesired modes of vibration in a restrained piezoelectric crystal element.

An object of my invention is to provide a multiplate flexing piezoelectric element which bends in substantially only one direction with or due to piezoelectric action.

A further object of my invention is to provide a piezoelectric element portions of which are adapted to move with greater amplitude than prior art devices.

It is another object of my invention to provide a piezoelectric element of advantageous piezoelectric characteristics and capable of being produced with economical use of piezoelectric material.

Another object of my invention is to provide an improved method for utilizing the piezoelectric effect of piezoelectric material.

A further object of my invention is to provide piezoelectric devices whereby improved piezoelectric effects may be obtained.

It is also an object of my invention to reduce the objectionable internal forces in a restrained piezoelectric element.

Still another object of my invention is to provide a multiplate flexing piezoelectric element which is restrained in only one direction.

Other objects and a fuller understanding of my invention may be had by referring to the following specification and the accompanying drawings in which.

Figures 1, 2, 3, 4, 5:
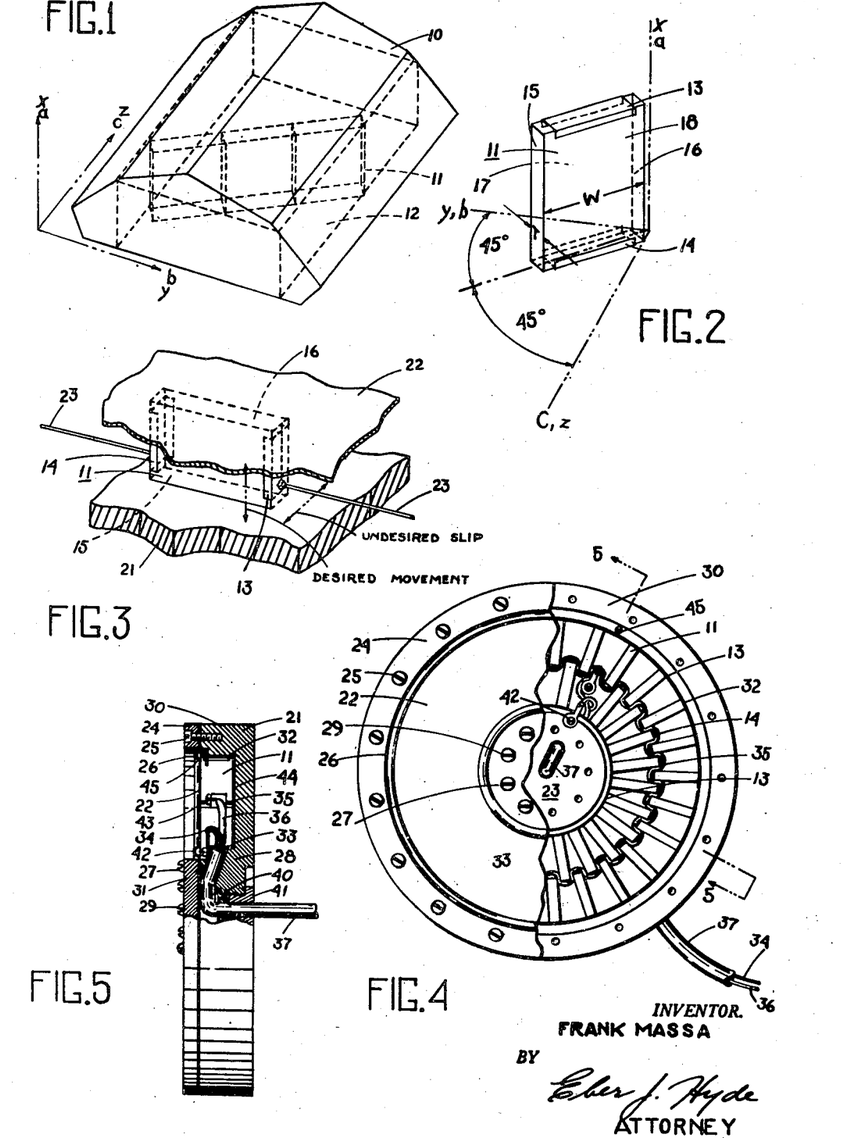
Figure 1 is an isometric view of a portion of a Rochelle salt-type crystal.
Figure 2 is an isometric view of a crystal element cut from the Rochelle salt-type crystal and showing the orientation with respect to the three crystallographic axes.
Figure 3 is a schematic drawing of one of my crystal elements mounted between a base and a diaphragm, and showing the directions of desired and undesired piezoelectric movement and their relation to the dimension of the element.
Figure 4 is a partially broken-away plan view of a speaker utilizing my new crystal element.
Figure 5 is a partially broken-away side view taken along line 5—5 of Figure 4.

Referring to the drawings, Figure 1 is a perspective representation of a portion of a virgin crystal 10 of the crystallographic class V (Rochelle salt) showing the direction of the orthogonal crystallographic axes X, Y and Z, and showing in construction lines the orientation and approximate relative dimensions of a crystal slab 12 and a crystal element 11 which may be cut from the crystal 10. For most efficient production the size of the crystal element 11 may be such that substantially a whole number (such as 3 or 4) elements may be obtained from one cut at 45° across the slab 12.

Figure 2 illustrates the crystal element 11 which has been cut from the crystal 10 and to which the electrodes 13 and 14 have been applied. The electrodes are applied to the only pair of crystal element faces which are perpendicular to the X orthogonal axis, and the dimension of the crystal element between the electrodes is large compared to either one or both of the other two dimensions of the element. It will be seen that each of the four unelectroded faces is at an angle of substantially 45 degrees to the Y and Z axes. The element, therefore, is an X-cut 45 degree element. The four unelectroded faces may be said to comprise two pair of faces, the first pair 15—16 being of small area, and the second pair 17—18 being of greater area. The dimensions of the element 11 is such that it is long between the electrodes 13 and 14, and that its width is substantially greater than its thickness. For convenience the width and thickness are designated in Figure 2.

It is known that an alternating field applied along the X-axis to a 45 degree X-cut crystal produces stresses in two directions each substantially perpendicular to the direction of the application of the field (that is, perpendicular to the X-axis) and substantially perpendicular to each other. It is also known that relatively little or no stress is produced due to direct piezoelectric action in the direction of the application of the field. Heretofore 45 degree X-cut crystals were made with a short dimension along the direction of the application of the field and with longer dimensions along two directions each substantially perpendicular to the direction of the field. For ordinary applications, stresses along the two longer dimensions caused no readily noticeable trouble. However, in high frequency speakers where one of the crystal faces having one of the longer stressed dimensions is in close frictional engagement with a substantially rigid base, the use of ordinary 45 degree X-cut crystals causes frictional heating between the crystal and the base. This heating sometimes is sufficient to impair the heat sensitive crystal element and causes undesired restraining forces to be applied to the crystal element thereby reducing its effectiveness.

Figure 3 diagrammatically illustrates the use of my crystal in association with a portion of a fixed base 21 and a portion of a diaphragm 22. The crystal element 11 is positioned between the base 21 and the diaphragm 22 in engagement with each, and with the electrodes 13 and 14 in electrical engagement with an electrical circuit 23 through which a signal current is adapted to flow. One direction of stress in the crystal element due to an electric field along the X-axis is substantially normal to the base 21 and to the diaphragm 22 and is indicated in Figure 3 as the direction of "desired movement." Another direction of stress in the crystal element due to an electric field along the X-axis, is substantially normal to the X-axis and to the first direction of stress, and is indicated in Figure 4 as the direction of "undesired slip." In the direction along the X-axis there is relatively little movement due to direct piezoelectric action of the element. The first motion is desired because it actuates the diaphragm 22 with respect to the base 21, and the second motion is undesired because it causes frictional heating between the crystal face 15 and the base 21 and between the crystal face 16 and the diaphragm 22. Further it causes undesired modes of vibration in the speaker.

In the description of Figure 3 the term "piezoelectric action" is used. This means that upon a charge of one polarity being applied to the electrodes of the plate, the plate expands in a first direction and contracts in a second direction; and that upon a charge of the opposite polarity being applied to the electrodes of the plate, the plate contracts in the first direction and expands in the second direction. The action is also reversible. Upon the application of a strain between two surfaces to deform the crystal along a particular direction, there is developed a voltage across the electrodes. Broadly speaking, therefore, it may mean a change in dimensions due to an applied charge, or an applied charge due to a change in dimensions.

It is in order to reduce this frictional heating and the undesired modes of vibration which accompany it that I cut and mount my crystal as disclosed. The crystal element 11 is cut from the virgin crystal 10 with such orientation and relative dimensions and mounted between the base 21 and the diaphragm 22 in such a position that expansion and contraction in the desired direction is relatively large and the expansion and contraction in the undesired direction is relatively small, thereby reducing to a minimum the amount of friction due to slippage between the crystal element face 15 and the fixed base 21, and between the crystal element face 16 and the diaphragm 22. The most effective manner of cutting the crystal is with a long dimension in a direction along the X-axis and with a short dimension in a direction at 90 degrees to the X-axis and at 45 degrees to the Y and Z axes. This establishes a pair of opposed crystal faces such as 15 and 16 which are of substantial area for contact with the base 21 and the diaphragm 22. The large area of these two faces may be defined by a long dimension and a short dimension, the long dimension being along the X orthogonal axis and therefore not subject to expansion and contraction due to direct piezoelectric effect, and the short dimension being at 45 degrees to the Y and Z orthogonal axes and therefore subject to expansion and contraction due to the piezoelectric effect. However, due to the fact that the changeable dimension is very small the amplitude of movement due to the piezoelectric effect is relatively small and the frictional heat developed is not excessive.

An ordinary 45 degree X-cut crystal mounted between base 21 and diaphragm 22 would have faces defined by two changeable dimensions and the longer would be in contact with the base and the diaphragm. Operation of the device would result in relative movement between the crystal and the base 21 and between the crystal and the diaphragm 22, and the amplitude of movement would be large. This would establish several undesired modes of vibration in the crystal and would be apt to cause excessive heating. In the crystal of my invention the undesired modes of vibration are reduced and the frictional heating is practically negligible. This is because the amplitude of movement between the crystal and the diaphragm or base has been reduced to a negligible amount. For some devices, particularly underwater speakers having a desired directional pattern, the ordinary 45 degree X-cut crystal is not satisfactory while the new crystal gives highly satisfactory results. Such devices are shown in Figures 4 and 5.

Figures 4 and 5 illustrate respectively a partially cut-away plan view and a partially cutaway side view of loudspeaker adapted to operate under water and utilizing a plurality of crystals 11 according to my invention.

The loudspeaker comprises a base portion 21 having a raised edge portion 30 and a center portion 28. Between the edge 30 and the center 28 there are a plurality of crystals 11. The crystals may be arranged concentrically in an inner and an outer ring as illustrated in the cutaway portion of Figure 4, with one of the unelectroded narrow faces 15 or 16 in engagement with the base 21, and the other in engagement with a diaphragm 22. The diaphragm 22 is connected at its outside edge to the raised edge portion 30 of the base by means of a ring 24 and a plurality of screws 25. Gasket means may be used between the diaphragm 22 and the edge 30 to prevent the ingress of water into the speaker. The central portion of the diaphragm is connected to the raised central portion 28 of the base 21 by means of a block 31 and a plurality of screws 29. The width of the crystal units 11 is such that they fit tight between the base 21 and the diaphragm 22 and upon an alternating signal being applied to the crystals the diaphragm 22 is driven with respect to the base 21. In order that the effective or radiating area of the diaphragm may move as nearly like a piston as possible, two raised annuli are provided in the diaphragm. The outer annulus 26 is near the ring 24 and the inner annulus 27 is near the block 31.

A cable 37 is brought into the speaker through the base 21 at the raised central portion 28, and waterproof connection means comprised of packing 40 and a nut 41 are provided for effecting a waterproof seal around the cable 37. The cable contains two leads 34 and 36. The lead 34 is connected to the central portion 28 of the base 21 by means of screw 42, and the lead 36 is connected to a central conductor spring 35 by means of a screw 43. The central conductor spring 35 is woven between the ends of the crystals in the inner and outer concentric circles of crystals and makes electrical contact with each of the electrodes 14. An insulating mat 44 is positioned against the inside surface of the base 21 and prevents the conductor spring 35 from making an electrical contact with the speaker housing. The mat 44 is cut away to allow the crystals 11 to extend through it and directly engage the base 21. Accordingly, there is no compressible material between the crystals 11 and the base 21. An inside conductor spring 33 is provided in electrical engagement with the lead 34 through the screw 42, and in electrical engagement with the electrodes 13 of the outer circle of crystals 11 through an outer conductor spring 32 and a screw 45 which connects the spring 32 to the base 21. The inside surface of the housing is coated with an insulating paint or lacquer to prevent undesired circuits. Accordingly, connections are made by means of screws threaded into the housing; such as screw 45 which effects an electrical contact between spring 32 and the base 21, and the screw 42 which effects an electrical contact between base 21 and the lead 34. The electrical path is, therefore, from the lead 34 to screw 42 where it splits into two paths, the first path being to the housing 21, to the screw 45, to the conductor spring 32, to the electrodes 13 of the outside circle of crystals, and then to the crystals; the second path is from the screw 42 to the inside conductor spring 33, to the electrodes 13 of the inside circle of crystals 11, and then to the crystals. The electrical path from lead 36 is to the screw 43, to the central conductor spring 35, to the electrodes 14 of both rings of crystals and then to the crystals. An alternating voltage on the circuit through the crystals causes the crystals to expand and contract and drive the diaphragm 22 with respect to the base 21. Due to the orientation of the faces of the crystals there will be substantially no movement of the crystals in a direction between the electrodes 13 and 14, but there will be a slight movement due to the piezoelectric effect in a direction substantially normal to the large faces 17 and 18 of the crystals. Due to the dimensions and orientation of the crystal unit with respect to the virgin crystal from which it was cut, the amplitude of movement of the portions of the crystal units which are in engagement with the diaphragm 22 or the base 21 will be very small. This results in very little heating due to friction, and materially reduces undesired modes of vibration compared to the modes present when standard 45 degree X-cut crystals are used.

Figures 6, 7, 8:
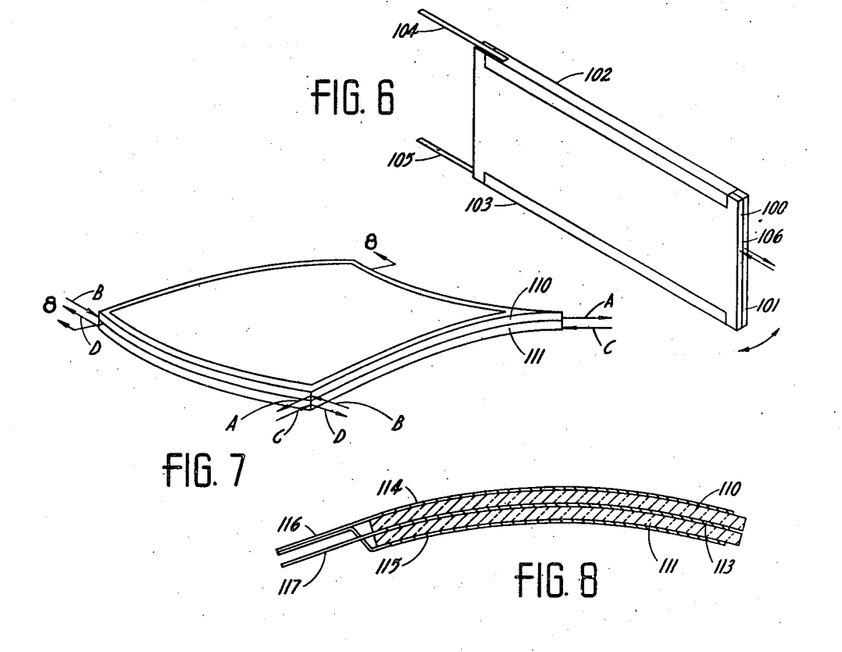
Figure 6 shows a multiplate flexing element made from my new crystal element.
Figure 7 illustrates in an exaggerated manner the bending action of prior art Rochelle salt type multiplate flexing elements.
Figure 8 is a sectional view taken along line 8—8 of Figure 7 and showing in addition thereto lead connections.

Figure 6 illustrates a multiplate flexing unit made of two plates of piezoelectric crystal cut from a mother crystal in accordance with my invention. The two plates 100 and 101 are cemented or otherwise held together and electrodes 102 and 103 are applied to their thin edges. Leads 104 and 105 are provided for connecting the crystal element into a circuit. Upon a voltage of alternating potential being applied to the electrodes 102 and 103 with the lead end anchored, the multiplate flexing unit will bend according to the arrow. For a detailed description of a somewhat similar flexing action, reference may be had to the Patent Re. 20,213, issued to Charles B. Sawyer.

The action of my multiplate flexing unit differs from the Sawyer unit in that it has a simple bending action whereas the Sawyer unit has a compound bending action. The Sawyer unit, in exaggerated terms, may be said to assume a saddle shape whereas my unit bends substantially in only one direction. Accordingly, less internal restraint to operation is evidenced by my crystal unit.

In Figure 7 I show two portions or plates 110, 111 of a piezoelectric crystal of the Rochelle salt type which have been cut from a crystal bar according to the Sawyer invention set forth in Patent Reissue 20,213, and which have been connected together to provide mutual restraint to motions due to the piezo-electric effect.

The plane of the connection between the two plates is perpendicular to the X-axis and parallel to the Y, Z axes, and each of the two plates 110, 111 when connected together has the same orientation with respect to these crystallographic axes. Due to this orientation when a field of given polarity is applied between the common electrode 113 and the two outside electrodes 114, 115, the field through the two plates will be oppositely directed, and one plate (say plate 110) will tend to expand in the direction of the arrows A and contract in the direction of the arrows B, and simultaneously the plate 111 will contract in the direction of the arrows C and expand in the direction of the arrows D, thereby causing a compound curvature of the multiplate unit about two axes.

Figure 8 is a cross-sectional view taken through the Sawyer unit shown in Figure 7 to show more clearly the positions of the electrodes 113, 114, and 115 with respect to the plates of crystalline material 110, 111, and to show how leads 116, 117 may be connected to the element.

Figure 9:
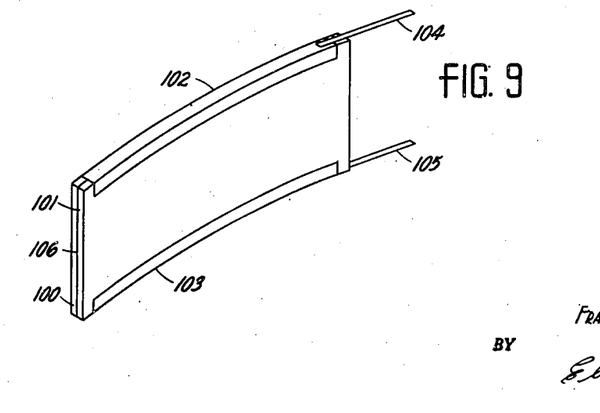
Figure 9 illustrates in an exaggerated manner the bending action of my new Rochelle salt type multiplate flexing element.
Figure 10:
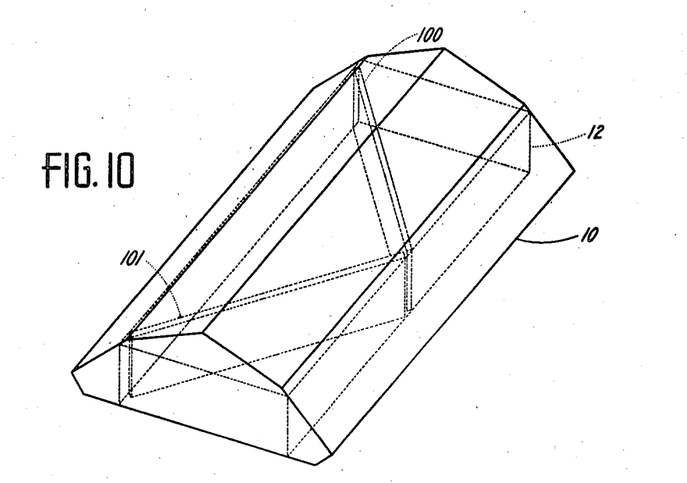
Figure 10 illustrates the manner in which the plates for my new multiplate flexing element are cut from a crystal bar.

Figure 9 shows the two plates 100 and 101 cut according to my invention, and connected together to provide mutual restraint to motions due to the piezoelectric effect. The plane of the connection 106 is parallel to the X-axis of the material and at an angle of substantially 45 degrees to the Y and Z axes. Only two electrodes 102, 103 are necessary. There is no common electrode between the crystal plates as there is in the Sawyer unit. Therefore, in order that a given field applied to the electrodes 102, 103 shall cause one plate to expand and the other to contract in a direction extending parallel to the plane of the connection 106, it is necessary that the two plates be cut from one or more crystal bars with a positional relationship such as is illustrated in Figure 10, or its equivalent. When the plates are cut according to Figure 10 and electroded, the given field will cause one plate to expand and the other to contract in a direction extending parallel to the plane of the connection 106. There will be no tendency for the plates to expand or contract in a direction parallel to the X-axis, so there will be no change in the width dimension between the electrodes 102, 103 due to the piezoelectric effect. There will, however, be a slight change in the thickness of each of the plates. The plate which increases in length will decrease in thickness, and the plate which decreases in length will increase in thickness. My unit is similar to the Sawyer unit in that each of the plates used will increase in one dimension and decrease in one dimension due to a given field. It differs, however, in that the two plates of my device are connected together so that only one of the dimensional changes in each plate is restrained, and the other is free, whereas in the Sawyer unit both dimensional changes are restrained. In my unit there is a simple curvature of the two plates about a single axis of curvature, and there is restraint between the plates in only one direction.

Figure 11:
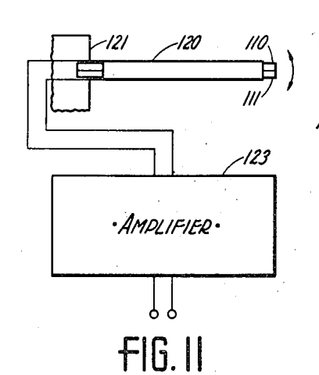
Figure 11 illustrates my unit clamped at one end and free at the other end.

Figure 11 illustrates my multiplate flexing unit 120 clamped at one end by clamp 121 and free at the other end to move in the direction of the arrow due to an electrostatic field on the unit or due to a force on the unit. The leads are brought out through the clamp 121 and are connected to a signal circuit which includes an amplifier 123. When clamped according to Figure 11 my device has a marked advantage over the Sawyer device due to its tendency to bend along only one axis of curvature, thereby maintaining the end portion more firmly clamped by clamp 121. As slab 110 tends to increase in thickness the slab 111 tends to decrease in thickness by the same amount and vice versa, thereby preventing an undue strain from being put on the cement which connects the end of the crystal unit to the clamp.

Figures 12, 13:
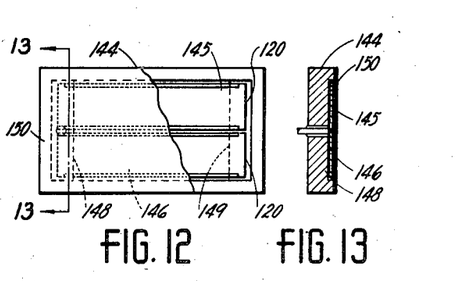
Figure 12 shows a unit used as a hearing aid microphone.
Figure 13 is a section taken along line 13—13 of Fig. 12.

Figures 12 and 13 illustrate my new crystal used with a hearing aid microphone, in which two of the units 120 are connected in parallel within a case 144, and in which the crystals form the diaphragm. The advantages of using my device as a hearing aid microphone are an increase in sensitivity and a decrease in cost. The decrease in cost arises from the ease with which the units can be cut and assembled, and the increased sensitivity arises from the increased thickness between the electrodes which makes the generated voltage per applied sound pressure higher than for a standard or Sawyer type multiplate unit which is thin between the electrodes. It is also true that the capacity of my unit will be lower than in prior art devices, but this need not interfere with its use if a very high input impedance amplifier can be used, such as is shown and described in Patent 2,288,600 to John P. Arndt, Jr., or if, as in the present case, it is used with a short grid lead to keep the cable capacity low. In hearing aid microphones this grid lead may easily be kept low thereby resulting in an absolute gain in efficiency over the prior art devices. Although not essential, I prefer to use two multiplate flexing units 145, 146 in parallel to keep the capacity down to a low value. The case 144 may be metal and grounded, and one electrode of each unit 145, 146 may be connected to the metal case. The other or central electrode may be common to both units and connected by a short lead to the grid of an amplifier. Supports 148, 149 are provided beneath each end of each of the two crystal units to establish supports about which the units may bend. A pliofilm cover 150 is applied over the open face of the case 144 for moisture-proofing.

Figure 14:
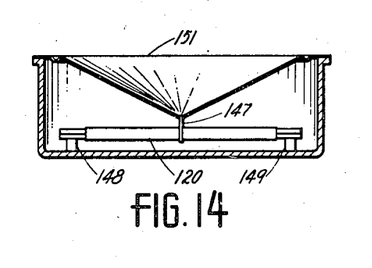
Figure 14 shows another type of hearing aid microphone.

Figure 14 illustrates my new crystal used with a hearing aid microphone, in which only one crystal unit 120 is used, and in which the crystal is actuated by a drive pin 147 which in turn is actuated by a diaphragm 151.

Figure 15:
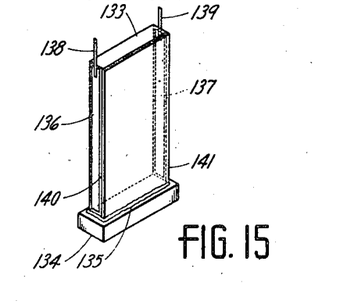
Figure 15 shows one plate of my crystal connected to a flexible plate to establish a different kind of a multiplate flexing element.

In Figure 15 a single plate 133 of crystal cut according to my invention is shown secured at one end to a suitable support 134 by adhesive material 135 such as shellac or Canada balsam. Electrodes 136, 137 are connected to the edge faces of the plate which are perpendicular to the X-axis of the crystalline material, and leads 138, 139 are connected to the electrodes. To one of the faces 140 is shown secured a portion 141 which may be of aluminum or plastic or other such light material.

The portion 141 should be thin but of sufficient strength to constrain the crystal plate 133, and they together may be termed a constrained piezoelectric element. The portion 141 preferably, though not necessarily, as co-extensive with the face 140, and is preferably secured to the crystal throughout the area of face 140 as by suitable adhesive material, and the restraining portion 141 may be secured to the support 134 by the adhesive 135. When the crystal plate 132 is subjected to an electrostatic field it will tend to contract or expand in only one direction which is parallel to the plane of portion 141 depending upon the polarity of the field. Since, however, the motion of the crystal plate 133 is constrained by the portion 141, the crystal plate is not free to elongate and contract, but undergoes a bending motion about one axis. As a result of the bending the free edge of the crystal plate 133 has a greater mechanical motion than if the plate were unconstrained, and as a result of the bending being about only one axis instead of two, the amplitude of movement is greater than in the prior art devices.

As in the Sawyer unit, my construction reduces to a large extent variations in the specific piezoelectric effect incident to variations in temperature and incident to variations in the level of applied energy.

Throughout this description the term "multiplate flexing" has been used to characterize the unit. "Multiplate" includes two or more plates connected together, and also includes utilizing non-piezoelectric plates with one or more piezoelectric plates, as illustrated by Figure 15.

Figure 1 illustrates cutting a crystal of class V (Rochelle salt) in order to obtain the plate of new dimensional orientation. My invention, however, is not restricted to the V class of crystals as it is also applicable to piezoelectric crystals in classes $D_4$, $V_d$, $D_6$, T and $T_d$; or, in other words, it is applicable to all piezoelectric crystal classes whose symmetry contains class V as a sub-group.

Particularly illustrated in Figure 1 is an X-cut plate in class V. The invention, however, also extends to X-cut plates in all of the other enumerated crystal classes, and to Y-cut plates in all of the enumerated class, and to Z-cut plates in classes V, $V_d$, T, and $T_d$.

Figures 16-19 illustrate my invention applied to a crystal 160 belonging to the crystal class $V_d$, exemplified by primary ammonium phosphate, and shows X, Y, and Z-cut plates thereof. The illustrated crystal 160 may be called a P-type crystal, and the term "P-type" crystal is to be understood as including primary ammonium phosphate ($NH_4H_2PO_4$), primary potassium phosphate, primary rubidium phosphate, the primary arsenates of ammonium, potassium, and rubidium, isomorphous mixtures of any of these named compounds, and all other piezoelectrically active crystalline materials isomorphous therewith. In Wyckoff's "The Structure of Crystals" (2nd ed., N. Y. 1931) this crystal type is called the $KH_2PO_4$-type; and in the "Strukturbericht" (supplement to Zeitschrift fuer Kristallography) this crystal is called the H-2-2 type.

Figure 16:
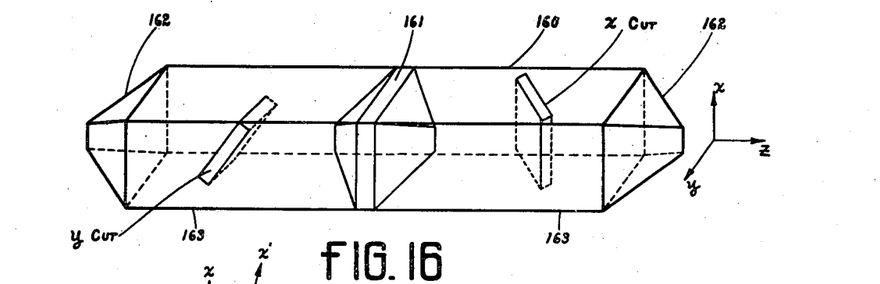
Figure 16 illustrates a P-type crystal.

Reference character 161 in Figure 16 indicates the seed portion of the mother crystal, and the reference character 162 indicates the pyramidal end portions which are characteristic of this crystal class. Between the seed portion 161 and each pyramidal end portion lies a prismatic bar portion 163 may be cut out of the mother crystal 160.

Figure 17:
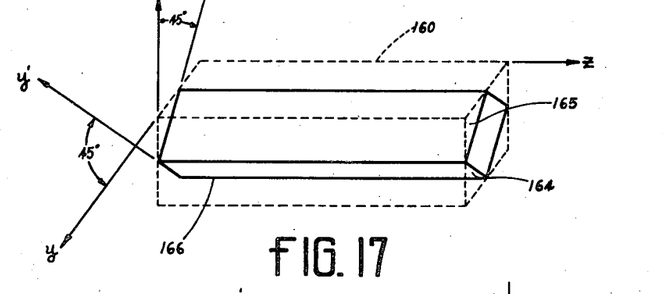
Figure 17 shows a bar cut from the P-type crystal of Figure 16.
Figures 18, 19, 20:
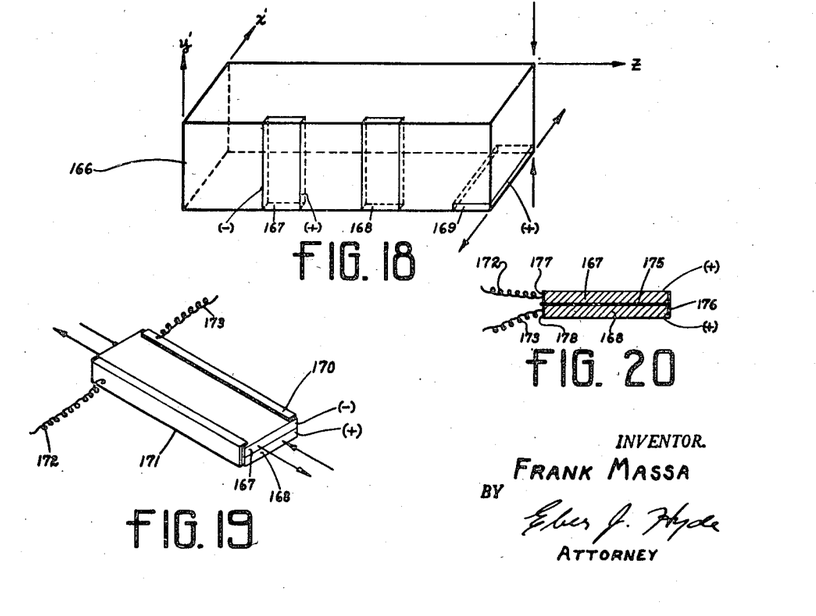
Figure 18 shows the orientation and dimensional relationship of plates cut from the bar of Figure 17.
Figure 19 shows a multiplate flexing element comprised of plates shown in Figure 18.
Figure 20 is a cross-sectional view of a series connected multiplate flexing unit.

To provide a Z-cut plate in accordance with the invention the prismatic bar 163 first is cut an an angle of 45 degrees to the X and Y axes to remove the edges of the bar to establish the edge faces 164 and 165 perpendicular to the X' and Y' axes respectively; the X' and Y' axes being rotated 45 degrees about the Z-axis with respect to the X and Y axes. This is illustrated in Figure 17 where the prismatic bar 163 is shown by dotted lines and the expander bar which is obtained by so cutting the prismatic bar 163 is shown in solid lines and is indicated by the reference character 166. The second step is shown by Figure 18 where the bar 166 (enlarged in its cross-sectional dimensions to better show the small expander plates 167, 168, and 169 which may be cut therefrom) is cut parallel to its edge faces to provide small crystal plates 167, 168, and 169. The arrows at the right-hand end of the bar 166 indicate the directions of change of dimension in the bar 166 and in the plates 167, 168, and 169 due to an electrical field of a given polarity being applied along the Z-axis of the crystalline material, or, in other words, applied between the end faces of the bar 166. For an electrical field of the opposite polarity the directions of the arrows would reverse.

Plates 167, 168, 169, have in common the characteristics that they are thin in one of the directions of piezoelectric expansion and contraction and they have one of their larger dimensions in a direction parallel to the Z or electrical axis of the crystalline material. This dimension of the plate which is parallel to the Z-axis of the crystalline material does not change due to the direct piezoelectric action.

The plates 167, 168, and 169 when connected together to form a multiplate flexing unit must be so oriented that for a given field between the electrodes, such as electrodes 170, 171 in Figure 19, that one plate tends to expand in a direction parallel to the plane of the connecting faces while the other plate tends to contract in a direction parallel to the plane of the connecting faces. The unit will then bend about only one axis of curvature; the other direction of expansion and contraction in the plates being normal to the plane of the connecting faces. Thus, for a parallel connected element, if we consider the right-hand edges of the plates 167, 168, 169 as positive (+) for a given exciting electrical field and the left-hand edges negative (−), then any two of the plates should be put together with a negative edge above a positive edge, as shown by the (−) and (+) signs associated with the plates in Figure 19. Leads 172, 173 may be provided connected to the electrodes 170, 171 for connecting the unit in an electric circuit.

Figure 20 is a cross-sectional view on an enlarged scale, of any two of the plates 167, 168, 169 put together in a manner to form a series connected multiplate flexing element. In this construction the two plates, for example 167 and 168, should be put together with a positive edge of one plate adjacent the positive edge of the other plate. Between the two plates there is an insulator 175, and an electrode 176 common to both plates 167, 168 is provided at one edge face of the unit. The insulator 175 should be as stiff to lateral shear forces as possible and each of the piezoelectric plates should be firmly connected to the insulator. An electrode 177 is connected to the other edge face of the plate 167 and an electrode 178 is connected to the other edge face of the plate 168. These electrodes 177, 178 are separated from each other by an insulator. I prefer to extend the insulator 175 so that it lies between the electrodes 177, 178. Leads 172, 173 may be connected to the electrodes 177, 178 for connecting the unit in an electric circuit.

The electrical axis of the crystalline material in a piezoelectric plate is parallel to the direction along which the electrical field is impressed to produce changes in dimensions of the plate in two mutually perpendicular directions which are both perpendicular to the electrical axis. This is true whether the plate is an X, Y, or Z-cut plate.

Throughout the specification and claims I have said that there is no change in dimension of the crystal plate in a direction along the electrical axis due to the piezoelectric effect. There may, however, be mechanical stresses occurring in such single and multiplate piezoelectric units which cause a certain amount of motion parallel to the electrical field direction. This motion is a secondary effect due to the elastic coupling of different stress and strain components of the crystal. For example, in a 45 degree X-cut Rochelle salt plate which is long in its X-axis dimension in accordance with my invention and which is long in its length dimension, the plate might be operated in the region of the lengthwise extensional resonant frequency. Such a plate will show cross contraction stresses not only in the thickness direction but also along the X-axis direction. In the case of a multiplate unit a change in dimension parallel to the X-axis direction will occur to some extent for frequencies well below the resonant range. This is due to the cross-contraction effect of an external stress set up by extensional and compressional stresses parallel to the length dimension which the two plates comprising the multiplate unit exert on each other. These cross-contraction effects are secondary effects, being caused by mechanical coupling to a direct piezoelectric effect, and therefore are not considered to be directly due to the piezoelectric action.

A convenient method of electroding the edge faces of thin crystal plates is to stack a number of them with their major faces together and then to gold plate the opposite edge faces which are in a plane perpendicular to the Z-axis thereof. Thus, each plate acts as a mask for the adjacent plate or plates to prevent gold from being deposited on the major faces. Other substances than gold obviously may be used, and the standard tin or silver foils may be used. Gold foil is also satisfactory.

Although I have described my invention with a certain degree of particularity, it is to be understood that the present disclosure has been made only by way of example and that numerous changes may be made without departing from the scope of the invention as hereinafter claimed.

I claim as my invention:

1. A six-sided plate comprised of piezoelectric crystalline material selected from one of the following crystallographic classes, V, $D_4$, $V_d$, $D_6$, T, $T_d$; said plate having two planar faces extending in a direction at 45 degrees to two of the crystallographic axes, and having two edge faces lying in the plane defined by said two crystallographic axes, and having its other two faces defining planes containing the third crystallographic axis of the crystalline material; said plate, through the piezoelectric effect, changing in dimension in two mutually perpendicular directions which are each perpendicular to the direction of the electrical field which is impressed thereon, the dimension of the plate in the direction of the electrical field being several times greater than at least one of the dimensions along said two mutually perpendicular directions which are perpendicular to the direction of said field.

2. The invention as set forth in claim 1, further characterized in this: that said plate is a 45 degree X-cut plate.

3. The invention as set forth in claim 1, further characterized in this: that said plate is a 45 degree Y-cut plate.

4. A six-sided plate comprised of piezoelectric crystalline material selected from one of the following crystallographic classes, V, $V_d$, T, $T_d$; said plate being a 45 degree Z-cut plate, and, upon having an electrical field impressed upon it in a direction parallel to said Z-axis causing, through the piezoelectric effect, changes in dimension in two mutually perpendicular directions at 45 degrees to the X—Y axes; the dimension of the plate in the direction of the electrical field being several times greater than at least one of the dimensions along said two mutually perpendicular directions which are at 45 degrees to the X—Y axes.

5. A six-sided plate comprised of piezoelectric crystalline material selected from one of the following crystallographic classes, V, $V_d$, T, $T_d$; said plate being a 45 degree Z-cut plate, and, upon having an electrical field impressed upon it in a direction parallel to said Z-axis causing, through the piezoelectric effect, changes in dimension in two mutually perpendicular directions at 45 degrees to the X—Y axes; the dimension of the plate in the direction of the electrical field being several times greater than at least one of the dimensions along said two mutually perpendicular directions which are at 45 degrees to the X—Y axes.

6. A substantially rectangular 45 degree X-cut piezoelectric plate, means for subjecting the plate to an alternating electric field in a direction along the X-axis thereof, the dimension of the plate in one direction perpendicular to the X-axis being several times greater than in the other dimension perpendicular to the X-axis, and the dimension of the plate in the direction parallel to the X-axis being equal to or larger than said one dimension.

7. A piezoelectric element of the expander type comprising a unitary plate having two of its six bounding faces electroded and perpendicular to the X orthogonal axis and each of the other two pairs of bounding faces at 45° to the other two orthogonal axes, said plate being characterized by having its dimensions in a direction along the X orthogonal axis several times larger than one of its dimensions in a direction at 45° to the other two orthogonal axes.

8. A 45° X-cut piezoelectric element of the Rochelle salt type having three dimensions, one of said dimensions being short and piezoelectrically active, the other two dimensions being several times longer than the short dimension, one of said longer dimensions being piezoelectrically active and the other longer dimension being piezoelectrically inactive.

9. A multiplate flexing unit comprised of two piezoelectric plates as set forth in claim 1, said plates being connected together with their planar faces in face-to-face relationship and with such orientation and electrical interconnection that for a given electrical field applied thereto one plate tends to expand and the other to contract, thereby establishing mutual restraint and consequent bending of the unit about only one axis of curvature.

10. A piezoelectric transducer element comprising in combination, a flexible plate-like portion of material having substantially the piezoelectric properties of Rochelle salt crystal, the said plate-like portion having an electrical axis substantially parallel to the major faces of the plate and being adapted to expand in one direction perpendicular to said electrical axis and simultaneously to contract in a direction perpendicular to the first direction and to the electrical axis when subjected to an electrostatic field of a given polarity substantially parallel to the said electrical axis and to contract in the first direction and expand in the second direction when the polarity of such field is reversed; and a flexible plate-like body cemented to one of the major faces of the said plate-like portion and adapted to oppose expansion and contraction of the said portion in only one direction and cause said portion, when subjected to the action of an electrostatic field of given polarity, to bend about only one axis of curvature, and conversely, cause the establishment of such an electrostatic field when the portion is mechanically bent.

11. A piezoelectric transducer element comprising, in combination, a plurality of flexible plate-like portions of material having substantially the piezoelectric properties of Rochelle salt crystal, said plate-like portions being disposed in opposed electrostatic relationship to each other with the large faces of each portion substantially parallel to an electrical axis, whereby each portion is adapted to expand in one direction parallel to its faces and simultaneously to contract in a direction perpendicular to the first direction and perpendicular to its large faces when subjected to an electrostatic field of a given polarity substantially parallel to the said electrical axis and to contract in the first direction and expand in the second direction when the polarity of such field is reversed; and means securing the plate-like portions together in face-to-face relationship in a manner to constrain them in only one of the said directions when a given electrostatic field is applied and cause the element to bend about only one axis of curvature parallel to the face thereof and, conversely, cause the establishment of such an electrostatic field when the element is mechanically bent.

12. In a piezoelectric device, the combination of a piezoelectric transducer element comprising in combination, a flexible plate-like portion of crystalline material selected from one of the following crystallographic classes: V, D$_4$, V$_d$, D$_6$, T, T$_d$; the said plate-like portion having an electrical axis substantially perpendicular to two of the smaller or edge faces of the plate and being adapted to expand in one direction perpendicular to said electrical axis and simultaneously to contract in its thickness direction when subjected to an electrostatic field of a given polarity substantially parallel to said electric axis and to contract in the first direction and expand in its thickness direction when the polarity of such field is reversed; and constraining means connected to a major face of said element to oppose expansion and contraction of the flexible portion in only one of the said directions when a given electrostatic field is applied and cause said portion to bend about only one axis of curvature and, conversely, cause the establishment of such an electrostatic field when the portion is mechanically bent, and means connected to the piezoelectric element and adapted to be driven by and to drive the said element.

13. In a piezoelectric device, the combination of a piezoelectric transducer element comprising in combination, a flexible plate-like portion of crystalline material selected from one of the following crystallographic classes: V, D$_4$, V$_d$, D$_6$, T, T$_d$; the said plate-like portion having an electrical axis substantially parallel to the major faces of the plate and being adapted to expand in one direction perpendicular to said electrical axis and simultaneously to contract in a direction perpendicular to the first direction and to the electrical axis when subjected to an electrostatic field of a given polarity substantially parallel to the said electrical axis and to contract in the first direction and expand in the second direction when the polarity of such field is reversed; and a flexible plate-like body cemented to one of the major faces of the said plate-like portion to oppose expansion and contraction of the said portion in only one direction when a given electrostatic field is applied and cause said portion to bend about only one axis of curvature, and conversely, cause the establishment of such an electrostatic field when the portion is mechanically bent, and means connected to the piezoelectric element and adapted to be driven by and to drive the said element.

14. In a piezoelectric device, the combination of a piezoelectric transducer element comprising in combination, a plurality of flexible plate-like portions of crystalline material selected from one of the following crystallographic classes: V, D$_4$, V$_d$, D$_6$, T, T$_d$; said plate-like portions being disposed in opposed electrostatic relationship to each other with the large faces of each portion substantially parallel to an electrical axis, whereby each portion is adapted to expand in one direction parallel to its faces and simultaneously to contract in a direction perpendicular to the first direction and perpendicular to its large faces when subjected to an electrostatic field of a given polarity substantially parallel to the said electrical axis and to contract in the first direction and expand in the second direction when the polarity of such field is reversed; and means securing the plate-like portions together in face-to-face relationship in a manner to constrain each of them in only one of the said directions when its plate-like portions are subjected to the action of an electrostatic field of given polarity and cause the element when its plate-like portions are subjected to the action of electrostatic fields of given polarity, to bend about only one axis of curvature parallel to the face thereof and, conversely, cause the establishment of such electrostatic fields when the element is mechanically bent, and means connected to the piezoelectric element and adapted to be driven by and to drive the said element.

15. In a piezoelectric device, the combination of a piezoelectric transducer element comprising in combination, a plurality of flexible plate-like portions of crystalline material selected from one of the following crystallographic classes: V, D$_4$, V$_d$, D$_6$, T, T$_d$; said plate-like portions being disposed in opposed electrostatic relationship to each other with the major part of faces of each portion substantially parallel to an electrical axis and with a pair of minor faces of each portion substantially perpendicular to the electrical axis whereby each portion is adapted to expand in one direction parallel to its said pair of minor faces and simultaneously to contract in a direction perpendicular to the first direction and parallel to its minor faces when subjected to an electrostatic field of a given polarity substantially parallel to the said electrical axis and to contract in the first direction and expand in the second direction when the polarity of such field is reversed, electrode means associated with outer minor edge faces only of said plate-like portions, and being substantially coextensive therewith, means connected to said electrode means to establish electrostatic fields of opposite senses through the plurality of plate-like portions, and means securing a major face of one of the plate-like portions to a major face of another of the plate-like portions in a manner to constrain them in only one of the said directions and cause the element, when its plate-like portions are subjected to the action of electrostatic fields of given polarity, to bend about only one axis of curvature and, conversely, cause the establishment of such electrostatic fields when the element is mechanically bent.

16. A piezoelectric transducer comprising, in combination a first plate of piezoelectric material selected from one of the following crystallographic classes: V, D₄, V_d, D₆, T, T_d; and having a pair of major faces and at least one pair of minor faces, a second plate of piezoelectric material selected from one of the following crystallographic classes: V, D₄, V_d, D₆, T, T_d; and having a pair of major faces and at least one pair of minor faces, means for securing one of the major faces of the first plate to one of the major faces of the second plate, and electrode means associated with said pair of minor faces, said two plates of piezoelectric material being oriented with respect to the orthogonal axes of the crystalline material to cause for an electrostatic field of given polarity between said electrode means one of said plates to expand in a given direction and the other of said plates to contract in the same direction thereby causing said plates to bend about only one axis of curvature, each of the said plates having its smallest dimension in a direction perpendicular to the plane of said second major faces.

17. A piezoelectric transducer element comprising, in combination, a pair of plates, of crystalline material selected from one of the following crystallographic classes: V, D₄, V_d, D₆, T, T_d; and being adapted to change dimensions by expanding in a first direction and simultaneously contracting in a second direction when an electrical field is applied in a third direction, means connecting one of said pair of plates with the plates so oriented that for a given electrical field one plate tends to expand and the other to contract in a given direction to the other of said pair of plates to cause each plate to constrain the other to oppose the changes of dimension in only one direction, first electrode means in engagement with edge faces of both of said plates, and second electrode means spaced from said first electrode means and in engagement with edge faces of both of said plates, said first and second electrode means being adapted to have an electrical potential difference between them the smallest dimension of said plates being in a direction parallel to the plane of said electroded edge faces.

18. A piezoelectric transducer element comprising in combination, a pair of plates of crystalline material selected from one of the following crystallographic classes: V, D₄, V_d, D₆, T, T_d; and each having its major faces adapted to expand or contract in only one direction when a given electrostatic field is applied to the plate, means connecting the said plates together with a major face of one in juxtaposed face-to-face relationship with a major face of the other and oriented to cause one of the connected major faces to expand in one direction and the other connected major face to contract in the same direction upon the application of a field of given polarity along the electrical axis of the crystalline material thereby causing the two plates to flex in a simple curve.

19. A piezoelectric transducer element comprising, in combination, a first plate of piezoelectric material, a second plate of piezoelectric material, means securing said first and said second plates together in face-to-face relationship, first electrode means common to both of said plates of material, second electrode means common to both of said plates of material and spaced from said first electrode means, said first and said second plates of material being oriented with respect to the crystallographic axes of the crystalline material to cause, for a given field between said spaced electrodes, one of said plates to expand in only one direction against a restraining force set up in the other plate and the other plate to contract in only one direction against a restraining force set up in the first plate, said expanding and contracting actions and said restraining forces causing said first and said second plates to bend.

20. A multiplate flexing element comprising two plates of piezoelectric crystalline material selected from one of the following crystallographic classes: V, D₄, V_d, D₆, T, T_d; and only two electrodes, said electrodes each being common to both of said plates, and said two plates having different orientation with respect to the direction of a given field between said two electrodes, and means securing said two plates together in face-to-face relationship whereby mutual restraint in only one direction is established upon the application of said given field thereby causing both of said plates to bend about only a single axis of curvature.

21. A plate-like piezoelectric crystal having a first dimension in a direction along which force is adapted to be applied, and having a second dimension in a direction perpendicular to said first direction along which said crystal reacts to said force by piezoelectrically changing its dimension, and having a third dimension in a direction perpendicular to said first and second directions along which there is substantially no direct piezoelectric change due to the application of said force; the dimension of said plate-like crystal in each of said first and third directions being several times larger than the dimension of said plate-like crystal in said second direction.

22. A "bender" type multiplate flexing unit comprising, a first and a second plate-like piezoelectric crystal of the Rochelle salt type, each of said plates having two of its bounding faces at an angle of substantially 45 degrees to the Y and Z orthogonal axes of the crystalline material, electrode means on the bounding faces of each of said two plates which are spaced apart along the X-axis of the crystalline material, the dimension of each of said plates between said electrode means being several times greater than the thickness dimension of said plates, and means securing said plates together in face-to-face relationship with the direction of expansion of one of said plates in the plane of its major face aligned with the direction of contraction of the other plate for a given electrostatic field between said electrode means.

23. A piezoelectric transducer element comprising; a thin six-sided plate of piezoelectric crystalline material selected from one of the following crystallographic classes: V, D₄, V_d, D, T, T_d, in which the two major faces and two of the four edge faces thereof are adapted to change dimension in only one direction upon the application of an electrical field, and in which the other two edge faces are adapted to change dimension simultaneously in two directions upon the application of said electrical field; electrode means on said other two edge faces; and constraining means connected to one of said major faces for opposing the change of dimension to cause said plate, when subjected to the electrical field of a given polarity between said electrodes, to bend about only one axis of curvature; the length and width dimensions of said plate each being at least several times greater than the thickness dimension thereof.

FRANK MASSA.

REFERENCES CITED

The following references are of record in the file of this patent:

UNITED STATES PATENTS

| Number | Name | Date |
|---|---|---|
| 1,717,263 | Rice | June 11, 1929 |
| 2,138,036 | Kunze | Nov. 29, 1938 |
| 2,292,885 | Mason | Aug. 11, 1942 |